United States Patent
Qiao et al.

(10) Patent No.: US 11,926,687 B2
(45) Date of Patent: Mar. 12, 2024

(54) POLAR MONOMER GRAFTED POLYPROPYLENE RESIN, PREPARATION METHOD THEREFOR AND APPLICATION THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Jinliang Qiao, Beijing (CN); Songhe Wang, Beijing (CN); Xiaohong Zhang, Beijing (CN); Guicun Qi, Beijing (CN); Zhihai Song, Beijing (CN); Chuanlun Cai, Beijing (CN); Xiang Wang, Beijing (CN); Jinmei Lai, Beijing (CN); Binghai Li, Beijing (CN); Haibin Jiang, Beijing (CN); Yue Ru, Beijing (CN); Jiangru Zhang, Beijing (CN); Jianming Gao, Beijing (CN); Hongbin Zhang, Beijing (CN); Peng Han, Beijing (CN); Wenlu Liu, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 763 days.

(21) Appl. No.: 17/051,069

(22) PCT Filed: Apr. 26, 2019

(86) PCT No.: PCT/CN2019/084622
§ 371 (c)(1),
(2) Date: Oct. 27, 2020

(87) PCT Pub. No.: WO2019/206288
PCT Pub. Date: Oct. 31, 2019

(65) Prior Publication Data
US 2021/0246248 A1  Aug. 12, 2021

(30) Foreign Application Priority Data

Apr. 27, 2018  (CN) .......................... 201810389316.2
Apr. 27, 2018  (CN) .......................... 201810389343.X

(51) Int. Cl.
*C08F 2/46* (2006.01)
*C08F 2/50* (2006.01)
*C08F 255/02* (2006.01)
*C08G 61/04* (2006.01)

(52) U.S. Cl.
CPC .................................. *C08F 255/02* (2013.01)

(58) Field of Classification Search
CPC .................. B01J 19/0066; B01J 19/126; B01J 2219/00166; C08F 255/02; C08F 222/06
USPC .................. 522/122, 120, 114, 113, 1; 520/1
See application file for complete search history.

(56) References Cited

U.S. PATENT DOCUMENTS

| | | | |
|---|---|---|---|
| 5,585,435 A | 12/1996 | Raetzsch et al. | |
| 5,612,097 A | 3/1997 | Foerch et al. | |
| 6,228,948 B1 | 5/2001 | Flaris et al. | |
| 2009/0286900 A1 | 11/2009 | Ichikawa et al. | |

FOREIGN PATENT DOCUMENTS

| | | | |
|---|---|---|---|
| CN | 1283642 A | | 2/2001 |
| CN | 1482151 A | | 3/2004 |
| CN | 1670049 A | | 9/2005 |
| CN | 1704436 A | | 12/2005 |
| CN | 1821299 | * | 8/2006 |
| CN | 1821299 A | | 8/2006 |
| CN | 101580558 A | | 11/2009 |
| CN | 101668781 A | | 3/2010 |
| CN | 102924661 A | | 2/2013 |
| CN | 103102455 A | | 5/2013 |
| CN | 104804143 A | | 7/2015 |
| DE | 4022570 A1 | | 1/1992 |
| JP | S4945141 A | | 4/1974 |
| JP | S5681323 A | | 7/1981 |
| JP | H02173008 A | | 7/1990 |
| JP | H06340723 A | | 12/1994 |
| JP | H07278327 A | | 10/1995 |

(Continued)

OTHER PUBLICATIONS

Yin et al, CN 1821299 Machine Translation, Aug. 23, 2006 (Year: 2006).*
Wang et al, Polymer Solid-Phase Grafting at Temperature Higher than the Polymer Melting Point through Selective Heating, Apr. 18, 2019, Macromolecules, 52, 3222-3230 (Year: 2019).*

(Continued)

*Primary Examiner* — Jessica Whiteley
(74) *Attorney, Agent, or Firm* — NKL Law; Allen Xue

(57) ABSTRACT

A grafted polypropylene resin is prepared by a grafting reaction of a polar monomer capable of absorbing microwave so as to raise its temperature in a microwave field to more than 200° C. and a solid polypropylene resin using microwave irradiation without adding an initiator. The polar grafted polypropylene resin that does not contain initiator residues and does not have a significant reduction in molecular mass compared with a resin before grafting is obtained.

50 Claims, 2 Drawing Sheets

(56) References Cited

FOREIGN PATENT DOCUMENTS

| | | |
|---|---|---|
| JP | 2012125556 A | 7/2012 |
| JP | 2015013988 A | 1/2015 |
| JP | 2016003332 A | 1/2016 |
| RU | 2430116 C1 | 9/2011 |
| SU | 608813 A1 | 5/1978 |

OTHER PUBLICATIONS

Wang, Songhe et al.; "Polymer Solid-Phase Grafting at Temperature Higher than the Polymer Melting Point through Selective Heating"; American Chemical Society,Macromolecules; vol. 52, No. 9; Apr. 18, 2019; pp. 3222-3230.

* cited by examiner

POLAR MONOMER GRAFTED POLYPROPYLENE RESIN, PREPARATION METHOD THEREFOR AND APPLICATION THEREOF

TECHNICAL FIELD

The present invention relates to the technical field of graft modification of polypropylene, in particular to a polar monomer-grafted polypropylene resin, and a preparation method therefor and applications thereof, as well as pellets, articles, composite materials, coatable film materials and bonding materials prepared from the grafted polypropylene resin.

BACKGROUND ART

Polypropylene is a general polymer material with a wide range of uses and has excellent physical and mechanical properties. However, due to its non-polarity and low surface energy properties, polypropylene has poor compatibility with most polymers and fillers, is not readily wetted and adhered, and has poor printing and coating properties, and when blended with polar materials, it also cannot obtain materials with good performance. Therefore, some methods are needed to improve the polarity of polypropylene. A common method is to graft polar monomers such as maleic anhydride onto the polypropylene backbone to increase its polarity. The methods of graft modification mainly include the solvent method, the melt method and the solid phase method.

The solvent method achieves a relatively high grafting ratio, and the temperature during the reaction process is relatively low. However, the organic solvent is generally toluene or xylene, thus it is quite complicated in post-treatment, high in cost, and poor in environmental friendliness, and has gradually been abandoned in industrial production.

The melt grafting method is currently the most reasonable method and is suitable for industrialized production. For example, Chinese patent application CN104804143 A reported that a maleic anhydride-grafted polypropylene with a high grafting ratio and no significant decrease in molecular weight compared with the raw material polypropylene was obtained by using a twin-screw extruder having an aspect ratio of greater than 48:1 and adding a mixed solution of styrene and an initiator at multiple positions in different barrel sections of the extruder. US patent U.S. Pat. No. 6,228,948B1 reported that with different process parameters and conditions in various sections of the twin-screw extruder, polypropylene and maleic anhydride were added to the extruder, and after they are molten, an initiator was added, and maleic anhydride was reacted and grafted onto the polypropylene molecular chain, thereby polypropylene having a grafting ratio of above 2% and having good overall properties was obtained. Chinese patent application CN102924661A reported that use of auxiliary monomers could increase the grafting ratio of polypropylene and inhibit the degradation of polypropylene, and at the same time, a new initiator was used to reduce the irritating odor of maleic anhydride-grafted polypropylene, and this initiator could also increase the degree of the grafting reaction and the degree of copolymerization with auxiliary monomers, to thereby obtain a maleic anhydride-grafted polypropylene having a high grafting ratio and low irritating odor.

However, the β-chain scission reaction during the melting grafting of polypropylene is an unavoidable side reaction during the grafting process. Therefore, the melt index of the maleic anhydride-grafted polypropylene product prepared by the melt grafting method is usually very high, that is, the molecular weight is greatly reduced, which will cause the mechanical properties of the polypropylene product to deteriorate. Hence, the main problem faced by the melt grafting method is how to obtain a sufficiently high maleic anhydride grafting ratio while maintaining the mechanical properties of the polypropylene matrix, that is, keeping the molecular weight substantially unchanged, so that upon blending with other materials, the final overall mechanical properties of the material will not be affected. The traditional solid phase method refers to the graft copolymerization reaction performed by mixing polypropylene with monomers, initiators, tensides, etc. The reaction temperature is low (100 to 140° C.), and polypropylene (having a melting point of about 164 to 171° C.) is still in the form of solid particles at the reaction temperature. Thus this method is called as solid phase grafting method. In the solid phase method, the reaction proceeds on the exposed polypropylene surface. Chinese patent application CN1283642A discloses a process for preparing a solid-phase graft copolymer of polypropylene and three monomers and applications thereof, wherein polypropylene, an initiator and three monomers were charged into a reactor in proportions, and the tenside xylene was added for the solid phase grafting reaction under a nitrogen atmosphere. Chinese patent application CN103102455A discloses a method for grafting polypropylene, wherein polypropylene, an organic acid (or salt) and a surfactant were added to a reactor with stirring, and an initiator was added after the reaction temperature was reached, to thereby perform the solid phase grafting reaction, wherein the initiator is wax-encapsulated peroxide microcapsules. Chinese patent application CN1704436A discloses a process for continuous solid phase grafting preparation of polypropylene and a device therefor. US patent application U.S. Pat. No. 5,585,435A discloses a production method for solid phase graft modification of polypropylene in a fluidized bed. Both of these techniques achieve a high grafting ratio by improving the contact efficiency of the reactants and initiators.

The above existing polypropylene graft modification methods all have the following deficiencies: graft modification leads to a decrease in molecular weight, there are monomers left in the products, initiators need to be used in the modification process, the products are odorous or the special equipment is needed, etc. Due to the wide applications of polar polypropylene and the huge market demand, a grafted polypropylene that is inexpensive, simple in the preparation method and does not have the above deficiencies has become an urgent problem to be solved. To solve the above problem, the present invention is proposed.

DISCLOSURE

The object of the present invention is to provide a polar monomer-grafted polypropylene resin prepared by microwave initiation and a preparation method therefor, which do not have the deficiencies of the existing grafted polypropylene resins and polypropylene graft modification methods. The grafted polypropylene resin product shall have no initiator residue, have a molecular weight that is not significantly reduced after grafting, and involve greatly reduced β-chain scission reaction during its preparation process.

Another object of the present invention is to provide a polar monomer-grafted polypropylene resin, which can achieve a relatively high grafting ratio.

Another object of the present invention is to provide an odorless polar monomer-grafted polypropylene resin which does not contain residual unreacted monomers or auxiliary grafting monomers.

Another object of the present invention is to provide a method for preparing a polar grafted polypropylene resin, which is simple in process, easy to operate, simple in the production equipment, low in cost and can be easily industrialized.

According to the present invention, it is unexpectedly found that the above object is achieved by utilizing the selective heating property of microwaves and by the grafting reaction of polar monomers, that are capable of absorbing microwaves so as to increase their temperature in the microwave field to higher than 200° C., and a solid polypropylene resin under microwave irradiation without the addition of an initiator.

Thus, in a first aspect, the present invention provides a polar monomer-grafted polypropylene resin, wherein the grafted polypropylene resin does not contain initiator residues, and the polar monomers are capable of absorbing microwaves so as to increase their temperature in the microwave field to higher than 200° C.

The term "microwave" as used herein refers to electromagnetic waves having a frequency of 300 MHz-300 GHz.

The term "polar monomer" as used herein refers to monomers containing oxygen, sulfur, nitrogen, halogen and other heteroatoms, or substituents thereof. The polar monomers that can be used in the present invention are capable of absorbing microwaves so as to increase their temperature in the microwave field to higher than 200° C.

Polar monomers that can be used can be determined by the following measurement method: Polar monomers are loaded into a 10 ml glass vial until the volume of the polar monomers accounts for ⅔ of the volume of the glass vial. Then, a thermocouple is inserted into the glass vial loaded with the polar monomers, the glass vial together with the thermocouple is placed in a microwave oven, microwaving is turned on, the temperature of the polar monomers under microwave irradiation is tested, and the polar monomers with the temperature exceeding 200° C under any power and time period can be used as the polar monomers in the present invention. Specifically, for example, under the condition of irradiating with a microwave having a power of 700 W for 30 min, the polar monomers tested to have a temperature increased to higher than 200° C. can be used in the present invention.

For example, the polar monomer can be selected from those polar monomers containing a carbon-carbon double bond, for example, the polar monomers containing a heteroatom selected from the group consisting of oxygen, sulfur, nitrogen, and halogen and combinations thereof or a substituent thereof, and containing a carbon-carbon double bond.

Preferably, the polar monomer can be selected from the group consisting of organic acids, derivatives of organic acids (such as anhydrides, esters, salts) and combinations thereof, preferably selected from the group consisting of maleic anhydrides, maleic anhydride derivatives, (meth)acrylic acids, (meth)acrylic acid derivatives (such as glycidyl methacrylate), vinyl acetates, alkenyl sulfonic acids and derivatives thereof, p-styryl formic acid, p-styryl acetic acid, itaconic acid, oleic acid, arachidonic acid and combinations thereof and salt forms thereof. The (meth)acrylic acids include acrylic acids, methacrylic acids and mixtures thereof.

The polar monomer is preferably one or more selected from the group consisting of maleic anhydrides, maleic anhydride derivatives, (meth)acrylic acids, (meth)acrylic acid derivatives (such as glycidyl methacrylate) and vinyl acetates, preferably maleic anhydrides, maleic anhydride derivatives, (meth)acrylic acids, (meth)acrylic acid derivatives, and more preferably maleic anhydrides, and salt forms thereof.

As used herein, the term "initiator" refers to a substance commonly used in the art to initiate the polymerization reaction (including grafting reaction) of monomers, such as free radical initiators, including peroxide initiators, azo initiators, and redox initiators, etc. Peroxide initiators can in turn be divided into organic peroxide initiators (such as dicumyl peroxide) and inorganic peroxide initiators.

In the grafted polypropylene resin according to the present invention, the grafting ratio can be 0.01%-8%, preferably 0.01%-6%. There are side groups of polar monomers on the backbone of polypropylene molecules, such as side groups of an organic acid or salt thereof. The grafting ratio of the side groups of an organic acid can be 0.01%-8%, preferably 0.01%-6%, more preferably 0.01%-3%, and most preferably 0.01%-1.2%. For an organic acid salt-grafted polypropylene resin, there are side groups of the organic acid salt on the backbone of the polypropylene molecules, and the grafting ratio of the side groups of the organic acid salt can be 0.01%-8%, preferably 0.01%-6%, more preferably 0.01%-3%, and most preferably 0.01%-1.2%.

The side groups of the organic acid salt may comprise at least one selected from the group consisting of side groups of maleic anhydrides, side groups of maleic anhydride derivatives, side groups of (meth)acrylic acids, side groups of (meth)acrylic acid derivatives (such as side groups of glycidyl methacrylate) and side groups of vinyl acetates after salt formation.

Herein, the grafting ratio of polar monomers is characterized by infrared spectroscopy.

The value of the water contact angle of the grafted polypropylene resin according to the present invention may be less than 90°, preferably less than 65°, as measured on a film prepared from the grafted polypropylene resin by a solution method. For example, for an organic acid-grafted polypropylene resin, after a film is formed by the solution method, the value of the water contact angle of the side of the film containing organic acid groups is less than 90°, preferably less than 65°. For an organic acid salt-grafted polypropylene resin, after a film is formed by the solution method, the value of the water contact angle of the side of the film containing organic acid salt groups is less than 90°, preferably 50°-0°, and more preferably 0°.

Herein, the water contact angle is measured by the following method: the grafted polypropylene resin is prepared into a film by the solution method, and the side of the obtained film containing the side groups of polar monomers is measured for water contact angle with a water contact angle measuring instrument.

The melt index of the grafted polypropylene resin according to the present invention is preferably less than or equal to the melt index of the polypropylene resin as the grafting base, that is to say, its melt index is less than or equal to the melt index of the raw material per se prior to grafting of the polypropylene resin. In the process of preparing the polar monomer-grafted polypropylene resin of the present invention, the β-chain scission reaction of the polypropylene is controlled, the phenomenon of decrease in the molecular weight of polypropylene will not occur, and the melt index of the grafted polypropylene can be maintained consistent with that of the raw material polypropylene, or even decreased.

Herein, the melt index is measured in accordance with the standard GB/T3682-2000.

The term "polypropylene" or "polypropylene resin" as used herein includes homopolymers and copolymers of propylene and mixtures thereof.

The polypropylene resin used as the grafting base may be selected from the group consisting of propylene homopolymers and propylene copolymers and mixtures thereof, preferably random copolymers of propylene. For example, the comonomer in the random copolymer of propylene may be selected from the group consisting of ethylene, α-olefins other than propylene, and combinations thereof, preferably ethylene, $C_4$, $C_5$, $C_6$ to $C_8$-α-olefins, and combinations thereof. More preferably, the random copolymer of propylene comprises only ethylene or one α-olefin other than propylene as the comonomer.

The polypropylene resin as the grafting base may also be an impact polypropylene resin, which comprises a rubber phase in addition to a propylene homopolymer. The rubber phase may be a copolymer formed by propylene and at least one selected from the group consisting of ethylene and α-olefins, preferably ethylene, $C_4$, $C_5$, $C_6$ to $C_8$ α-olefins as the comonomer.

Preferably, the rubber phase of the impact polypropylene resin is formed by polymerizing propylene and ethylene or one α-olefin other than propylene.

The polypropylene resin used as the grafting base may be in a solid form including powders, pellets or articles, preferably polypropylene powders obtained by polymerization using a spherical catalyst.

Method for the preparation of a polar monomer-grafted polypropylene resin

In a second aspect, the present invention further provides a method for the preparation of a polar monomer-grafted polypropylene resin according to the present invention, comprising the step of subjecting the polar monomer and the solid polypropylene resin to a grafting reaction under microwave irradiation without the addition of an initiator. During the grafting reaction, it is also possible not to use auxiliary grafting monomers.

In the method of the present invention, the amount of the polar monomer can be 0.1-10% by weight, preferably 1-8% by weight based on the weight of the solid polypropylene resin used as the raw material.

The polar monomer may be in liquid or solution form. If the polar monomer itself is liquid at ambient temperature, the polar monomer itself can be used; in other cases, the polar monomer can be dissolved in a solvent to obtain a solution for use. The solvent may be at least one selected from the group consisting of organic solvents such alcohols, ketones, esters, and water, preferably acetone or ethanol.

The solid polypropylene resin as the grafting base can be used in the form of powders, pellets or articles.

Specifically, the method may comprise the following steps:
1) sufficiently mixing the polar monomer with the solid polypropylene resin; and
2) subjecting the mixture obtained in step 1) to microwave irradiation, preferably under an inert gas atmosphere.

In step 1), the polar monomer and the solid polypropylene resin can be sufficiently mixed under vacuum. For example, the solid polypropylene resin can be sufficiently mixed with the polar monomer solution under vacuum. Vacuum facilitates more sufficient mixing of the polar monomer and the polypropylene resin, especially for the polypropylene resin with pores, it promotes entering of the grafting monomer into the pores of the polypropylene resin and is more favorable to the grafting reaction.

In step 2), the inert gas can be one or more selected from the group consisting of nitrogen, helium, and argon.

If the polar monomer is in the form of a solution dissolved in a solvent, the mixture obtained in step 1) is dried to remove the solvent prior to step 2).

If desired, the irradiated mixture obtained in step 2) is washed to remove unreacted polar monomers and dried. The solvent used for washing may be at least one selected from the group consisting of organic solvents, such as alcohols, ketones and esters, and water, and is preferably water.

More specifically, the method of the present invention may comprise the following steps:
1') dissolving the polar monomer in a solvent to obtain a solution of the polar monomer;
1) mixing the solid polypropylene resin with the solution of the polar monomer obtained in step 1') sufficiently, followed by drying treatment;
2) subjecting the mixture obtained in step 1) to microwave irradiation, preferably under an inert gas atmosphere;
3) washing the irradiated mixture obtained in step 2) with a solvent to remove unreacted polar monomer and performing drying treatment to obtain a polar monomer-grafted polypropylene resin. The solvents in the above step 1') and step 3) can be at least one selected from the group consisting of water and organic solvents, and they two can be the same or different from each other.

The amount of the solvent used in the above step 1') only needs to be able to dissolve the polar monomer to form a solution, preferably, the amount of the solution of the polar monomer obtained is such that the solid polypropylene resin used as the raw material can be completely immersed in order to facilitate the sufficient mixing of them two. Generally, the weight ratio of the polar monomer to the solvent can be in the range of (0.1-100):100, preferably (0.5-50):100, and more preferably (1-30):100.

Further, the method of the present invention may further comprise step 4) on the basis of the above steps:
subjecting the product obtained in step 3), optionally with addition of an additive, to melt extrusion pelletization, to obtain pellets of the grafted polypropylene resin.

In the method according to the present invention, the solid polypropylene resin as the raw material is preferably free of an antioxidant. The solid polypropylene resin in step 1) is preferably a polypropylene resin, such as powders, without the addition of an antioxidant. Generally, the polypropylene resin raw materials in the prior art comprise a certain antioxidant, which is added upon the melt extrusion pelletization of the polypropylene powder obtained after the polymerization reaction. The solid polypropylene resin or powder in the present invention is preferably a solid polypropylene resin or powder that is obtained by polymerization- and has not been subjected to melt extrusion pelletization. At this time, the solid resin or powder is free of an antioxidant. Antioxidants tend to consume free radicals in the subsequent graft modification, thus the use of the polypropylene resin without the addition of an antioxidant achieves better grafting effect.

The solid polypropylene resin used in the method according to the present invention can be at least one of the various common types of solid polypropylene resins or powders in the prior art, such as homopolymerized polypropylenes, random copolymerized polypropylenes, and impact copolymerized polypropylenes.

The polymerization process of the solid polypropylene resin in the present invention is known in the prior art. The solid polypropylene resin of the present invention is preferably a polypropylene powder obtained by polymerization using a spherical catalyst. The particles of the polypropylene powder obtained by polymerization by a spherical catalyst are spherical and the particles have many pores on the surface. Therefore, such polypropylene powder has a large specific surface area and a large contact area with polar monomer, which helps to obtain a graft product having a higher grafting ratio.

When the polypropylene resin of the present invention is a random copolymerized polypropylene, the comonomer of the random copolymerized polypropylene comprises at least one of ethylene or α-olefin comonomers other than propylene; preferably ethylene, $C_4$ α-olefin, $C_5$ α-olefin, and $C_6$ α-olefin to $C_8$ α-olefin, more preferably ethylene, 1-butene, 1-heptene, 1-hexene and 1-octene, and still more preferably ethylene and $C_4$ α-olefin, even more preferably ethylene and 1-butene, most preferably ethylene. The comonomer may comprise a mixture of the above ethylene and/or α-olefin comonomers other than propylene, preferably only ethylene or one α-olefin monomer; in the most preferred embodiment, the random copolymerized propylene comprises propylene and ethylene only.

When the solid polypropylene resin of the present invention is impact copolymerized polypropylene, the impact copolymerized polypropylene comprises a rubber phase in addition to a propylene homopolymer. The rubber phase is formed by the polymerization of propylene and a comonomer. The comonomer is at least one of ethylene or α-olefins other than propylene; preferably ethylene, $C_4$ α-olefin, $C_5$ α-olefin, and $C_6$ α-olefin to $C_8$ α-olefin, more preferably ethylene, 1-butene, 1-heptene, 1-hexene and 1-octene, still more preferably ethylene and $C_4$ α-olefin, still more preferably ethylene and 1-butene, and most preferably ethylene. The rubber phase of the impact copolymerized polypropylene is preferably formed by polymerization of propylene and ethylene or an α-olefin other than propylene; in the most preferred embodiment, the rubber phase only comprises a copolymer of propylene and ethylene.

The polar monomers that can be used in step 1) are as described above.

In step 1), various mixing methods known in the prior art can be used to sufficiently mix the polar monomer and the solid polypropylene resin, and it is preferable to use common stirring manners and stirring equipment. Among others, the stirring equipment can be conventional stirring devices such as magnetic stirring device and mechanical stirring device.

The drying in the above step 1) can use various conventional drying methods known in the prior art, including but not limited to, for example, blast drying, room temperature drying and the like. The preferred drying temperature is a temperature at which polypropylene does not melt, for example, not more than 160° C.

The irradiation power of the microwave irradiation in step 2) can be 100w-2000w, preferably 500-1000w, and more preferably 600w-800w; the irradiation time can be 1s-120 min, preferably 1 min-30 min, and more preferably 3 min-10 min. The microwave irradiation can be carried out by using existing various microwave reactors in the prior art.

The inert gas in step 2) may comprise one or more of nitrogen, helium, and argon, preferably nitrogen.

The solvent in step 3) may comprise at least one of alcohols, ketones, esters and water, preferably water.

In step 3), the washing of the irradiated mixture is not particularly limited, as long as the residual polar monomers (such as organic acid) can be removed, and common washing methods can be used. For example, after microwave irradiation, at a high temperature, the solvent having a volume that exceeds the solid polypropylene resin is immediately used for immersing for a certain period of time (such as 5-15 minutes), and then redundant solvent or water is removed by a filtration device; the immersion and filtration are repeated multiple times (such as 2-6 times), thereby a clean solid polypropylene resin is obtained. The drying in step 3) is the same as that in step 1), and various conventional drying methods in the prior art can be used, including but not limited to, blast drying, room temperature drying and the like. The preferred drying temperature is a temperature at which polypropylene does not melt, for example, not more than 160° C.

For the melt extrusion pelletization in step 4), a common melt extrusion equipment in plastic processing is used to pass the polar monomer-grafted polypropylene resin through the conventional melt extrusion equipment for melt extrusion pelletization to thereby obtain the pellets of the polar monomer-grafted polypropylene resin. The useful additives are those commonly used in the rubber and plastic processing field, such as antioxidants, plasticizers, lubricants, release agents (calcium stearate), etc.

In the preparation process, the blending temperature of the materials is a common processing temperature for the polypropylene resin and is selected within the range that not only ensures the complete melting of the polypropylene resin but also does not cause its decomposition. In addition, according to processing needs, common aids for polypropylene, such as antioxidants and plasticizers, can be added in a common amount to the polar monomer-grafted polypropylene resin.

Method for preparing an organic acid salt-grafted polypropylene resin

In order to prepare an organic acid salt-grafted polypropylene resin, an organic acid or its derivative (such as anhydride or ester) and a solid polypropylene resin (such as powders) can be subjected to microwave irradiation for graft reaction to obtain a grafted product, then the grafted product is reacted with a base (such as hydroxide). The term "organic acid-grafted polypropylene" or "organic acid-grafted solid polypropylene resin" herein includes polypropylenes or solid polypropylene resins grafted with an organic acid or its anhydride or ester.

Preferably, an organic acid-grafted polypropylene powder and an aqueous solution of a base are sufficiently mixed to react under vacuum, and optionally a solvent is used for washing to remove the unreacted base and drying treatment is performed, to thereby obtain an organic acid salt-grafted polypropylene resin.

The base may be a hydroxide, preferably selected from the group consisting of ammonia and metal hydroxides, such as sodium hydroxide, potassium hydroxide, barium hydroxide, lithium hydroxide, strontium hydroxide, calcium hydroxide, iron hydroxide, and ferrous hydroxide, zinc hydroxide, magnesium hydroxide, cobalt hydroxide, gold hydroxide, aluminum hydroxide, copper hydroxide, beryllium hydroxide, and rare earth hydroxide, and preferably is selected from the group consisting of sodium hydroxide, potassium hydroxide, barium hydroxide, lithium hydroxide, strontium hydroxide, calcium hydroxide, and combinations thereof.

Specifically, the method for preparing an organic acid salt-grafted polypropylene resin may comprise the following steps:

1') dissolving an organic acid or its derivative monomer in a solvent to obtain a solution of the organic acid or its derivative monomer; and dissolving a base (such as a hydroxide) in a solvent (such as water) to obtain an alkali solution (preferably an aqueous solution);

1) sufficiently mixing a solid polypropylene resin (such as powders) with the solution of the organic acid or its derivative monomer obtained in step 1'), and then performing drying treatment;

2) subjecting the mixture obtained in step 1) to microwave irradiation, preferably under an inert gas atmosphere;

3) washing the irradiated mixture obtained in step 2) with a solvent to remove the unreacted organic acid or its derivative monomer and performing drying treatment to obtain an organic acid-grafted solid polypropylene resin;

4) sufficiently mixing the organic acid-grafted solid polypropylene resin obtained in step 3) with the alkali solution prepared in step 1') under vacuum to react;

5) washing the reaction mixture obtained in step 4) with a solvent to remove the base that has not reacted with the organic acid-grafted solid polypropylene resin and performing drying treatment to obtain an organic acid salt-grafted solid polypropylene resin.

The above solvent is at least one from the group consisting of water and organic solvents, and among the solvents in step 1'), step 3) and step 5), at least two are the same or they are all different from one another.

The hydroxide in step 1') can be one or more from the group consisting of ammonia and metal hydroxides, preferably sodium hydroxide, potassium hydroxide, barium hydroxide, lithium hydroxide, strontium hydroxide, calcium hydroxide, iron hydroxide, ferrous hydroxide, zinc hydroxide, magnesium hydroxide, cobalt hydroxide, gold hydroxide, aluminum hydroxide, copper hydroxide, beryllium hydroxide, and rare earth hydroxide, more preferably sodium hydroxide, potassium hydroxide, barium hydroxide, lithium hydroxide, strontium hydroxide, calcium hydroxide, and most preferably sodium hydroxide, potassium hydroxide, and calcium hydroxide. Sodium hydroxide is most preferred.

The amount of the solvent used for the organic acid or its derivative monomer in step 1') is as described above for the solvent for the polar monomers.

The amount of the solvent (preferably water) used to dissolve a base in step 1') is only required to be able to dissolve the base, such as hydroxide, to form a solution. Preferably, the amount of the alkali solution obtained is such that the organic acid-grafted solid polypropylene resin can be completely immersed, so as to be more favorable to the sufficient mixing and reaction of them two. Generally, the weight ratio of the solvent (preferably water) to the base (such as hydroxide) can be (0.1-100):100, preferably (0.5-50):100, more preferably (1-30):100. The amount of the base (such as hydroxide) can be 0.1-10% by weight, preferably 1-8% by weight, based on the weight of the raw material polypropylene resin used.

In this method, the drying treatment in step 1), step 3) and step 5) can adopt various conventional drying methods in the prior art, including but not limited to, air blast drying, room temperature drying and the like. The preferred drying temperature is a temperature at which polypropylene does not melt, for example, not more than 160° C.

In step 4), various mixing methods in the prior art can be used to sufficiently mix the organic acid-grafted solid polypropylene resin and the alkali solution, preferably common stirring manners and stirring equipment are used. Among others, the stirring equipment can be conventional stirring devices such as magnetic stirring device and mechanical stirring device.

In step 4), the alkali solution and the organic acid-grafted solid polypropylene resin are sufficiently mixed and reacted at the same time. There is no special requirement for the reaction time, as long as the reaction sufficiently proceeds. Generally, after the addition of the alkali solution is completed, mixing is further carried out and at the same time the reaction proceeds for a period of time, for example, 1-20 minutes, preferably 2-8 minutes. The reaction temperature and pressure are not limited and are generally normal temperature and normal pressure.

The solvent in step 5) is the same as or different from the solvent in step 3), and includes at least one of alcohols, ketones, esters, and water, preferably water. In step 5), the washing of the reaction mixture after the mixing reaction is not particularly limited, as long as the residual base can be removed, and a common washing method can be used. For example, the solvent having a volume that exceeds the solid polypropylene resin (such as polypropylene powders) is used for immersion for a certain period of time (such as 5-15 minutes) at a high temperature immediately after microwave irradiation, and then the redundant solvent or water is removed by a filtration device; the immersion and filtration are repeated multiple times (such as 2-6 times), thereby a clean solid polypropylene resin is obtained.

The method preferably further comprises: subjecting the powder obtained in the above step 5), optionally with addition of an additive, to melt extrusion pelletization to obtain pellets of organic acid salt-grafted polypropylene resin. Herein, for melt extrusion pelletization, a common melt extrusion equipment in plastic processing is used to pass the organic acid salt-grafted polypropylene powder through the conventional melt extrusion equipment for the melt extrusion pelletization and thereby prepare the organic acid salt-grafted polypropylene resin pellets. The useful additives are those commonly used in rubber and plastic processing field, such as antioxidants, plasticizers, lubricants, release agents (calcium stearate), etc.

In the preparation process, the blending temperature of the materials is a common processing temperature for the polypropylene resin and is selected within the range that not only ensures the complete melting of the polypropylene resin but also does not cause its decomposition. In addition, according to processing needs, common aids for polypropylene, such as antioxidants and plasticizers, can be added in a common amount to the organic acid salt-grafted polypropylene powder.

Preparation method using an inorganic microwave absorbing medium In one embodiment of the preparation method according to the present invention, an inorganic microwave absorbing medium may be used.

An inorganic microwave absorbing medium can be added prior to the microwave irradiation.

The amount of the inorganic microwave absorbing medium can be 0.1-10% by weight, preferably 1-8% by weight, based on the weight of the solid polypropylene resin.

As the inorganic microwave absorbing medium, the various inorganic substances in the prior art, that can absorb microwaves, can be used. For example, the inorganic microwave absorbing medium can be selected from the group consisting of metal hydroxides, preferably potassium hydroxide, barium hydroxide, sodium hydroxide, lithium hydroxide, strontium hydroxide, calcium hydroxide, iron hydroxide, ferrous hydroxide, zinc hydroxide, magnesium hydroxide, cobalt hydroxide, gold hydroxide, aluminum hydroxide, copper hydroxide, beryllium hydroxide, and rare earth hydroxide; metal salts, preferably ammonium nitrate, potassium nitrate, sodium nitrate, barium nitrate, calcium nitrate, magnesium nitrate, aluminum nitrate, manganese nitrate, zinc nitrate, iron nitrate, ferrous nitrate, copper nitrate, silver nitrate, ammonium chloride, potassium chloride, sodium chloride, barium chloride, calcium chloride, magnesium chloride, aluminum chloride, manganese chloride, zinc chloride, iron chloride, ferrous chloride, copper chloride, ammonium sulfate, potassium sulfate, sodium sulfate, calcium sulfate, magnesium sulfate, aluminum sulfate, manganese sulfate, zinc sulfate, iron sulfate, ferrous sulfate, copper sulfate, silver sulfate, ammonium carbonate, potassium carbonate, sodium carbonate, magnesium carbonate, calcium carbonate, barium carbonate, potassium dihydrogen phosphate, barium titanate, strontium titanate, and copper calcium titanate; metal oxides, preferably ferric oxide, and ferroferric oxide; graphite materials, preferably carbon black, graphite powder, graphene oxide and its reduction products (the reducing agent being for example ascorbic acid), graphene, carbon nanotubes, and activated carbon; ferroelectrics materials; electrolysis stone; chalcopyrite; and their combinations.

A polar monomer (optionally dissolved in a solvent), an inorganic microwave absorbing medium (optionally dissolved or dispersed in a solvent) and a solid polypropylene resin can be sufficiently mixed prior to the microwave irradiation. Two of the polar monomer, the inorganic microwave absorbing medium and the solid polypropylene resin can be mixed first, and then mixed with the rest one, or the three can be mixed together. The mixing process is preferably carried out under vacuum condition.

The mixing process can be performed by various mixing methods commonly used in the prior art, and by common stirring manners and stirring equipment, such as mechanical stirring mixing, centrifugal mixing and magnetic stirring mixing, so that the polar monomer is sufficiently dissolved in the solvent, the microwave absorbing medium can be sufficiently and stably dissolved or dispersed in the solvent, and the mixed substances are sufficiently mixed.

In one embodiment, the polypropylene resin is first mixed with a polar monomer optionally dissolved in a solvent, and then the resulting mixture is mixed with an inorganic microwave absorbing medium optionally dissolved or dispersed in a solvent.

The solvent used to dissolve the polar monomer and the solvent used to dissolve or disperse the inorganic microwave absorbing medium may be the same or different and are preferably selected from the group consisting of water and organic solvents (such as alcohols, ketones, esters). The solvent used to dissolve the polar monomer can be at least one selected from the group consisting of alcohols, ketones, esters and water, preferably acetone or ethanol. The solvent used to dissolve or disperse the inorganic microwave absorbing medium can be at least one selected from the group consisting of alcohols, ketones, esters and water, preferably water.

The amount of the solvent used to dissolve or disperse the microwave absorbing medium only needs to be able to dissolve the microwave absorbing medium to form a microwave absorbing medium solution, or to disperse the microwave absorbing medium sufficiently and uniformly. Preferably, the amount of the microwave absorbing medium solution or dispersion as obtained can completely immerse the mixture of the polar monomer and the polypropylene resin, so as to be more convenient for the sufficient mixing and reaction of them three. Generally, the weight ratio of the solvent to the microwave absorbing medium in the microwave absorbing medium solution or dispersion can be (0.1-100):100, preferably (0.5-50):100, more preferably (1-30):100.

In order to ensure that the microwave absorbing medium can form a sufficiently dispersed and stable dispersion with the solvent, a common surfactant in the prior art can be added to the microwave absorbing medium dispersion. Generally, surfactants such as polyoxyethylene type and polyol type can be used, and the amount is generally 0.1-100% by weight of the inorganic microwave absorbing medium.

Preferably, drying treatment may be performed after the above mixing to remove the solvent in the mixture prior to the microwave irradiation. The microwave absorbing medium can be removed by washing with a solvent after irradiation grafting. The solvent for washing is at least one selected from the group consisting of water and organic solvents, preferably at least one selected from the group consisting of alcohols, ketones, esters and water, and preferably water.

Further Products and Applications

In a third aspect of the present invention, the present invention further provides pellets or articles, which are obtained from the grafted polypropylene resin according to the present invention, optionally with addition of an additive, through melt extrusion pelletization or a further molding process. The useful additives are those commonly used in rubber and plastic processing field, such as antioxidants, plasticizers, lubricants, mould release agents (calcium stearate), etc.

In a fourth aspect of the present invention, the present invention provides composite materials, coatable film materials and bonding materials, which can be obtained by blending the grafted polypropylene resin of the present invention with other polymers. The composite material is, for example, an inorganic substance-filled polyolefin composite material and a glass fiber-reinforced polyolefin composite material.

In a fifth aspect of the present invention, the present invention further provides the use of the grafted polypropylene resin of the present invention for modifying plastics.

The polar monomer-grafted polypropylene resin of the present invention can be widely used in plastic modification, including but not limited to, blending the polar monomer-grafted polypropylene resin (pellets or powders) with other polymers to prepare composite materials, coatable film materials and bonding materials, etc. Specifically, in plastic modification, the polar monomer-grafted polypropylene resin of the present invention can be used as a compatibilizer when polypropylene is blended and composited with other polymers; for example, in materials such as inorganic substance-filled polyolefin composite materials, glass fiber-reinforced polyolefin composite materials, coatable film materials and bonding materials, it can improve the interfacial interaction between the inorganic materials or other components and the polypropylene resin, so that the resulting material has excellent overall properties and can be applied in automobiles, tools, and construction engineering and other fields.

In the present invention, by utilizing the selective heating characteristic of microwave, the polar monomer and the solid polypropylene resin are subjected to a grafting reaction using microwave irradiation without the addition of an initiator, so as to prepare a polar monomer-grafted polypropylene resin with no initiator residue and no significant reduction in molecular weight. Without being bound by any theory, the applicant believes that the solid polypropylene resin (such as powders) is microwave transparent in a microwave environment (it absorbs little or no microwave under microwave irradiation, thus it does not generate heat under microwave irradiation), while the polar monomer used in the present invention can absorb microwave, so that its temperature in the microwave field is increased to higher than 200° C., and such a temperature increase can cause dehydrogenation of the tertiary carbon atom in the polypropylene molecular chain near the polar monomer to thereby generate free radicals, and such free radicals further initiate the reaction of the polar monomer to thereby graft onto the polypropylene chain; the increased temperature is near the melting point of polypropylene and will not lead to chain scission of polypropylene, thus leads to grafting reaction, but not chain scission reaction of polypropylene; such grafting reaction by microwave can greatly avoid the β-chain scission reaction of polypropylene upon melt grafting, does not reduce the molecular weight of polypropylene, and maintains the excellent mechanical properties of the articles. Since no initiator is added in the method of the present invention, the grafted polypropylene resin as obtained will not comprise any initiator residue, thereby avoiding the adverse effects of the initiator residue on properties and subsequent processing of the product, and further, avoiding the large amount of β-chain scission reactions of polypropylene caused by the addition of an initiator as well as the resulting increase in the melt index of polypropylene and the corresponding decrease in molecular weight, and avoiding the possible competition between the grafting reaction and the self-polymerization reaction under the circumstance of the addition of an initiator, to thereby increase the grafting ratio.

In the case of an organic acid-grafted polypropylene, further reacting it with a base (such as a metal hydroxide) can convert the organic acid-grafted polypropylene into an organic acid salt-grafted polypropylene, which will further improve the polarity of grafted polypropylene.

In the preferred case of adding a microwave absorbing medium, the grafting ratio of the polar monomer can be increased. Due to the selective heating of microwave, the inorganic microwave absorbing medium is heated, so that its temperature is increased in the microwave environment, thereby promoting the rapid increase of the temperature of the polar monomer near it to above 200° C., and thus more effectively initiating the grafting reaction without occurrence of the chain scission reaction, so that an efficient grafting reaction can be realized in a short period of time and a polar polypropylene having a relatively high grafting ratio can be obtained.

In addition, since in the preferred case, no auxiliary grafting monomers are added and the unreacted polar monomer and base (such as hydroxide) can be fully removed, it is possible to obtain a grafted polypropylene having a high polarity with no significant decrease in molecular weight, no residual monomer, no initiator residue, and no color and odor.

The preparation process of the present invention is simple, easy to operate, simple in production equipment, low in cost and easy to be industrialized.

Figure 1:
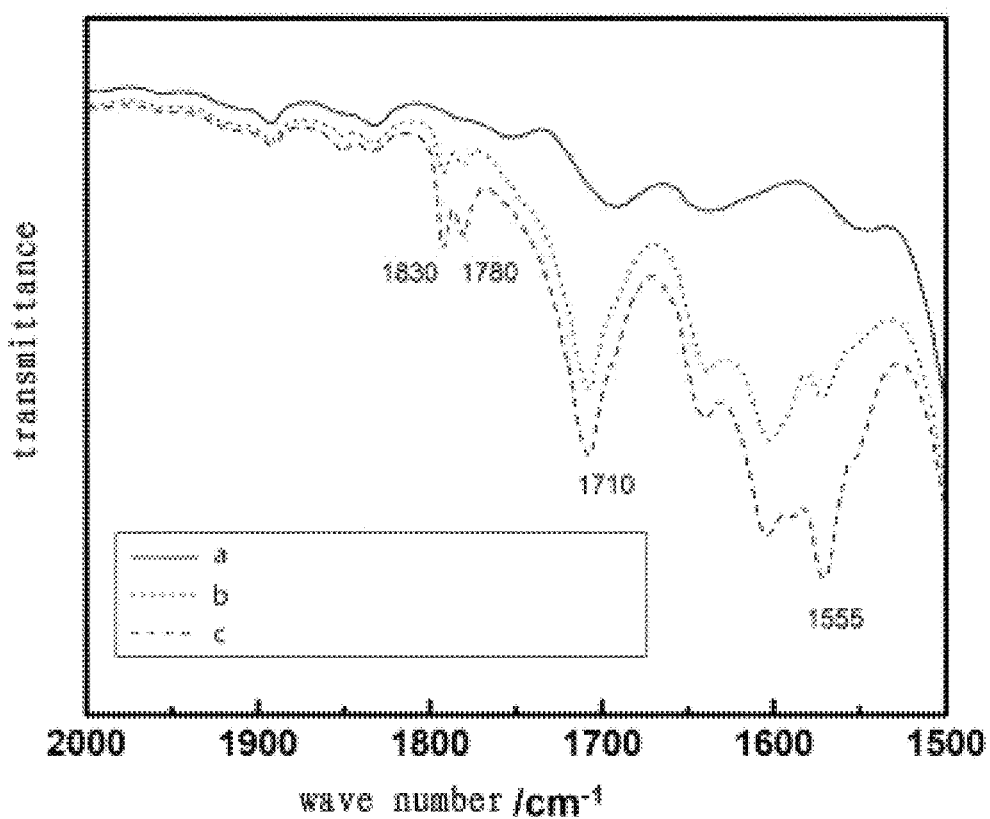
FIG. 1 shows the infrared spectra of the maleic anhydride-grafted polypropylene samples prepared in Examples 1 and 2 according to the present invention, wherein curve a is the curve of a pure polypropylene powder, curve b is the curve of the maleic anhydride-grafted polypropylene obtained after microwave irradiation for 3 minutes in Example 1, and curve c is the curve of the maleic anhydride-grafted polypropylene obtained after microwave irradiation for 5 minutes in Example 2.

For the organic acid-grafted polypropylene, the monomer is grafted to the polypropylene molecular chain in the form of anhydride. After washing with water, part of the anhydride groups are ring-opened into the acid, and part of them are still anhydride. It can be seen from FIG. 1 that the polypropylene samples after the completion of grafting all have anhydride groups and carboxylic acid groups, and the extension of the microwaving time helps to increase the grafting ratio.

Figure 2:
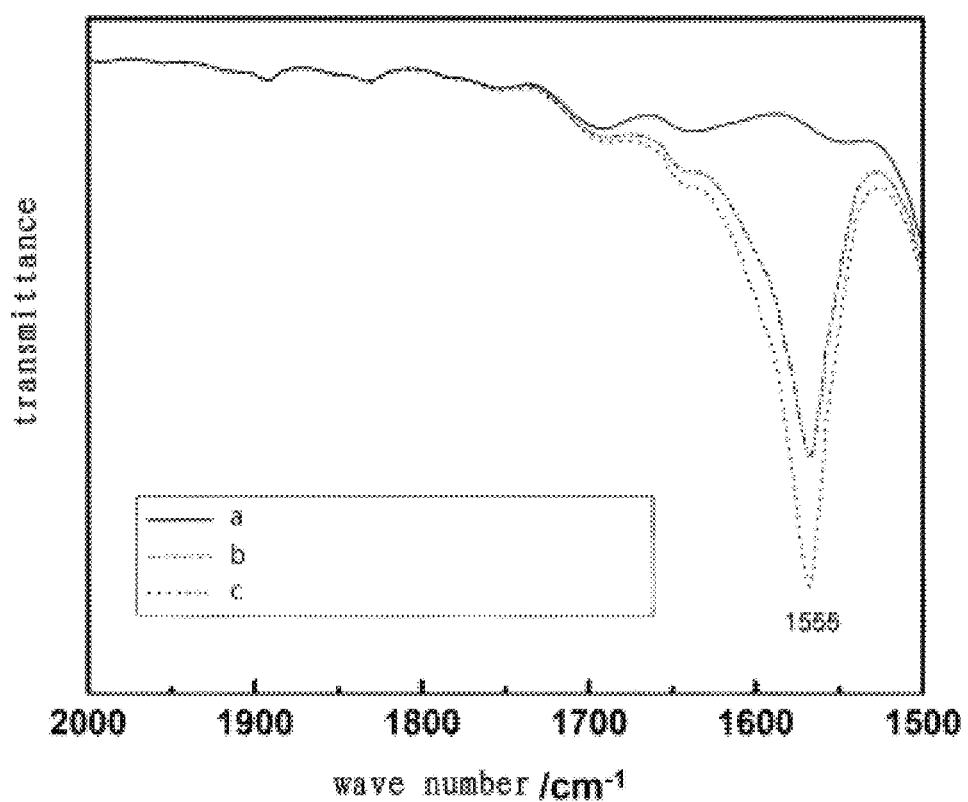

FIG. 2 shows the infrared spectra of the organic acid salt-grafted polypropylene samples prepared in Examples S1 and S2 according to the present invention, wherein curve a is the curve of a pure polypropylene powder, curve b is the curve of the organic acid salt-grafted polypropylene obtained after microwave irradiation for 3 minutes in Example S1, and curve c is the curve of the organic acid salt-grafted polypropylene obtained after microwave irradiation for 5 minutes in Example S2.

For the organic acid salt-grafted polypropylene, there is only one acid salt peak. That is because at this time the anhydrides or acids grafted to the polypropylene molecular chain are all salinized and can become the acid salt peak. It can be seen from the infrared spectra of FIG. 2 that the grafted polypropylene samples after the completion of grafting and the reaction with the hydroxide all have carboxylic acid groups, and the extension of the microwaving time helps to increase the grafting ratio.

EXAMPLES

In the following, the present invention is further illustrated with reference to the examples. However, the scope of the present invention is not intended to be limited by these examples, while the scope of the present invention is set forth in the appended claims.

The experimental data in the examples and comparative examples were determined with the following instruments and equipments and measuring methods:

(1) The melt index of the resin in the examples and comparative examples was determined with reference to the standard GB/T3682-2000.

(2) The instrument for measuring the water contact angle in the examples and comparative examples: German EASYDROP contact angle tester.

The method for preparing the sample for measuring the contact angle of the resin was as follows: 4 g of the resin was dissolved in 40 ml of xylene (analytical reagent AR), the resin was sufficiently dissolved in xylene at 120° C.; then the xylene solution of the resin was poured into a watch glass having a diameter of 100 mm for film making, the watch glass was placed in a 110° C. oven to sufficiently evaporate the solvent to obtain a resin film sample; then the resin film sample was sufficiently washed in ethanol and air dried to obtain a sample for measuring the contact angle of the resin. The sample underwent phase separation during the film making by the solution method. The dispersed phase was the side containing the polar monomer (organic acid or organic acid salt), and the other side was only polypropylene. The polar monomer side group-containing side of the obtained contact angle measurement sample was subjected to the water contact angle measurement using the above water contact angle tester.

(3) The grafting ratio of the polar monomer (organic acid or organic acid salt) in the examples and comparative examples was characterized by infrared spectroscopy as follows:

First, a standard curve was established. The mixed samples of high temperature-resistant dodecenyl succinic anhydride (DDSA) and pure polypropylene resin in different ratios were used as standard samples, the infrared absorption peak area at 1818-1755 cm$^{-1}$ (the summit of the peak was at about 1782 cm$^{-1}$) of the carbonyl group (C=O group) of the anhydride in the dodecenyl succinic anhydride and the absorption area at 484-435 cm$^1$ (the summit of the peak was at about 460 cm$^{-1}$) of the polypropylene internal standard peak were determined, and by plotting the ratio of them two relative to the content of the maleic anhydride, a standard curve of the grafting ratio of the maleic anhydride in the grafted polypropylene could be obtained.

The specific process for testing the grafting ratio of a grafted sample was as follows:

A. For the microwave grafted samples used in the examples and comparative examples, since deionized water had been used to sufficiently remove the unreacted MAH monomer after the grafting was completed, it was only necessary to press the samples into a transparent film having a thickness of about 100 μm on a flat vulcanizer (a temperature of 200° C.), then the characteristic absorption peak was measured with an infrared spectrometer (model: Nicolet iS 50, Nicolet Company), and then the grafting ratio was calculated by the above standard curve.

B. For the samples grafted with a melt method in the comparative examples, the testing process was as follows: about 1 g of the grafted polypropylene sample obtained in the comparative examples was weighed, placed in 20 ml of xylene, heated until complete dissolution, and then immediately poured into 150 ml of acetone, the unreacted small molecules and monomers that were not grafted onto the polypropylene molecules were dissolved in acetone, and the white floccules isolated were pure grafted substances. They were filtered, dried, and then pressed into a transparent film having a thickness of about 100 μm on a flat vulcanizer (a temperature of 200° C.), the characteristic absorption peak was determined with an infrared spectrometer, and then the grafting ratio was calculated by the above standard curve. The grafting ratio of the organic acid salt-grafted polypropylene of the present invention can be equal to the grafting ratio of the organic acid-grafted polypropylene obtained in the step of grafting the polypropylene with the organic acid.

(4) The microwave reactor used: SINEO multifunctional microwave synthesis and extraction instrument, model: UWave-2000.

The raw materials used in the examples and comparative examples and their manufacturers were as follows:

Homopolymerized polypropylene powder (Zhenhai Refining & Chemical Company M60, MI=60 g/10 min, obtained by polymerization with a spherical catalyst), random copolymerized polypropylene powder (Zhenhai Refining & Chemical Company M60ET, MI=60 g/10 min, obtained by polymerization with a spherical catalyst), impact copolymerized polypropylene powder (Zhenhai Refining & Chemical Company M30RH, MI=30 g/10 min, obtained by polymerization with a spherical catalyst), maleic anhydride (Xilong Scientific Co., Ltd.), acrylic acid (Sinopharm Chemical Reagent Co., Ltd.), methacrylic acid (Sinopharm Chemical Reagent Co., Ltd.), sodium chloride (Sinopharm Chemical Reagent Co., Ltd.), graphene oxide (Nanjing Jicang Nano Technology Co., Ltd.), ascorbic acid (J&K Scientific Ltd.), sodium hydroxide (Xilong Scientific Co., Ltd.), potassium hydroxide (Xilong Scientific Co., Ltd.), calcium hydroxide (Xilong Scientific Co., Ltd.), acetone (Xilong Scientific Co., Ltd.), dicumyl peroxide (Tianjin Guangfu Fine Chemical Research Institute), antioxidant 1010 (BASF), antioxidant 168 (BASF), and calcium stearate (Tianjin Jinke Fine Chemical Research Institute).

Example 1

Based on 100 parts by mass of a homopolymerized polypropylene powder, maleic anhydride (5 parts by mass) was dissolved in acetone (50 parts by mass) to obtain an acetone solution of maleic anhydride; the acetone solution of maleic anhydride was added to the polypropylene powder with mechanical stirring under vacuum and mixed sufficiently, then the mixture was dried (dried in a blast drying oven at 80° C.). The dry powder of polypropylene/maleic anhydride mixture after drying was irradiated with a microwave (power of 700 W) for 3 minutes under a nitrogen atmosphere; after the completion of the microwave irradiation, the powder was immersed in deionized water for 10 minutes and the deionized water was replaced, which was repeated 3 times to ensure the removal of the maleic anhydride monomers that were not involved in the grafting reaction, and then the powder was placed in a blast drying oven at 80° C. for drying. Finally, the powder and 0.1 part by mass (based on 100 parts by mass of the homopolymerized polypropylene powder) of antioxidant 1010, 0.1 part by mass of antioxidant 168 and 0.1 part by mass of calcium stearate were melt extruded and pelletized in a twin-screw extruder, the temperature of the feeding section of the extruder was 190-200° C., the temperature of the mixing section was 200-210° C., and the temperature of the head was 190-200° C. After extrusion and pelletization, the melt index, contact angle and grafting ratio were tested, and the test results are shown in Table 1.

Example 1'

Based on 100 parts by mass of a homopolymerized polypropylene powder, maleic anhydride (5 parts by mass) was dissolved in acetone (50 parts by mass) to obtain an acetone solution of maleic anhydride; sodium chloride (3 parts by mass) was dissolved in deionized water (50 parts by mass) to obtain an aqueous solution of sodium chloride; the acetone solution of maleic anhydride was added to the polypropylene powder with mechanical stirring under vacuum and mixed sufficiently, then the mixture was dried (dried in a blast drying oven at 80° C.). The dry powder of polypropylene/maleic anhydride mixture after drying was mixed sufficiently with the aqueous solution of sodium chloride, then the mixture was dried (dried in a blast drying oven at 80° C.); the dry powder of polypropylene/maleic anhydride/sodium chloride mixture after drying was irradiated with a microwave (power of 700 W) for 2 minutes under a nitrogen atmosphere; after the completion of the microwave irradiation, the powder was immersed in deionized water for 10 minutes and the deionized water was replaced, which was repeated 3 times to ensure the removal of the maleic anhydride monomers and sodium chloride that were not involved in the grafting reaction, and then the powder was placed in a blast drying oven at 80° C. for drying. Finally, the powder and 0.1 part by mass (based on 100 parts by mass of the homopolymerized polypropylene powder) of antioxidant 1010, 0.1 part by mass of antioxidant 168 and 0.1 part by mass of calcium stearate were melt extruded and pelletized in a twin-screw extruder, the temperature of the feeding section of the extruder was 190-200° C., the temperature of the mixing section was 200-210° C., and the temperature of the head was 190-200° C. After extrusion and pelletization, the melt index, contact angle and grafting ratio were tested, and the test results are shown in Table 1.

Example 1"

Except that the dry powder of polypropylene/maleic anhydride/sodium chloride mixture after drying was irradiated with a microwave (power of 700 W) for 3 minutes under a nitrogen atmosphere, the rest were the same as those in Example 1'. The sample was tested for melt index, contact angle and grafting ratio, and the test results are shown in Table 1.

Comparative Example 1

Based on 100 parts by mass of a homopolymerized polypropylene powder (the same as Example 1), maleic anhydride (5 parts by mass) and dicumyl peroxide (0.005 part by mass) were dissolved in acetone (50 parts by mass) to obtain an acetone solution of maleic anhydride; the acetone solution of maleic anhydride was added to the polypropylene powder with mechanical stirring under vacuum and mixed sufficiently, then the mixture was dried (dried in a blast drying oven at 80° C.). The dry powder of polypropylene/maleic anhydride mixture after drying was irradiated with a microwave (power of 700 W) for 3 minutes under a nitrogen atmosphere; after the completion of the microwave irradiation, the powder was immersed in deionized water for 10 minutes and the deionized water was replaced, which was repeated 3 times to ensure the removal of the maleic anhydride monomers that were not involved in the grafting reaction, and then the powder was placed in a blast drying oven at 80° C. for drying. Finally, the powder and 0.1 part by mass of antioxidant 1010, 0.1 part by mass of antioxidant 168 and 0.1 part by mass of calcium stearate were melt extruded and pelletized in a twin-screw extruder, the temperature of the feeding section of the extruder was 190-200° C., the temperature of the mixing section was 200-210° C., and the temperature of the head was 190-200° C. After extrusion and pelletization, the melt index, contact angle and grafting ratio were tested, and the test results are shown in Table 1.

Example 2

Except that the dry powder of polypropylene/maleic anhydride mixture after drying was irradiated with a microwave (power of 700 W) for 5 minutes under a nitrogen atmosphere, the rest were the same as those in Example 1. The sample was tested for melt index, contact angle and grafting ratio, and the test results are shown in Table 1.

Comparative Example 2

Except that the dry powder of polypropylene/maleic anhydride mixture after drying was irradiated with a microwave (power of 700 W) for 5 minutes under a nitrogen atmosphere, the rest were the same as those in Comparative Example 1. The sample was tested for melt index, contact angle and grafting ratio, and the test results are shown in Table 1.

Example 3

Except that the dry powder of polypropylene/maleic anhydride mixture after drying was irradiated with a microwave (power of 700 W) for 7 minutes under a nitrogen atmosphere, the rest were the same as those in Example 1. The sample was tested for melt index, contact angle and grafting ratio, and the test results are shown in Table 1.

Comparative Example 3

Except that the dry powder of polypropylene/maleic anhydride mixture after drying was irradiated with a microwave (power of 700 W) for 7 minutes under a nitrogen atmosphere, the rest were the same as those in Comparative Example 1. The sample was tested for melt index, contact angle and grafting ratio, and the test results are shown in Table 1.

Example 4

Except that the dry powder of polypropylene/maleic anhydride mixture after drying was irradiated with a microwave (power of 700 W) for 10 minutes under a nitrogen atmosphere, the rest were the same as those in Example 1. The sample was tested for melt index, contact angle and grafting ratio, and the test results are shown in Table 1.

Comparative Example 4

Except that the dry powder of polypropylene/maleic anhydride mixture after drying was irradiated with a microwave (power of 700 W) for 10 minutes under a nitrogen atmosphere, the rest were the same as those in Comparative Example 1. The sample was tested for melt index, contact angle and grafting ratio, and the test results are shown in Table 1.

Comparative Example 5

Based on 100 parts by mass of a homopolymerized polypropylene powder (the same as Example 1), dicumyl peroxide (0.005 part by mass) was dissolved in acetone (20 parts by mass) to obtain an initiator solution; maleic anhydride (5 parts by mass) and the polypropylene powder were subjected to solid-phase dry mixing with a stirring blade in a metal mug, and during the mixing process, the above well-dissolved peroxide initiator solution was added. Finally, the well-mixed reactants and 0.1 part by mass of antioxidant 1010, 0.1 part by mass of antioxidant 168 and 0.1 part by mass of calcium stearate were melt extruded and pelletized in a twin-screw extruder, the temperature of the feeding section of the extruder was 190-200° C., the temperature of the mixing section was 200-210° C., and the temperature of the head was 190-200° C. After extrusion and pelletization, the melt index, contact angle and grafting ratio were tested, and the test results are shown in Table 1.

Example 5

Except that maleic anhydride (1 part by mass) was dissolved in acetone (50 parts by mass) to obtain an acetone solution of maleic anhydride, and the dry powder of polypropylene/maleic anhydride mixture after drying was irradiated with a microwave (power of 700 W) for 7 minutes under a nitrogen atmosphere, the rest were the same as those in Example 1. The sample was tested for melt index, contact angle and grafting ratio, and the test results are shown in Table 1.

Comparative Example 6

Except that maleic anhydride (1 part by mass) was dissolved in acetone (50 parts by mass) to obtain an acetone solution of maleic anhydride, and the dry powder of polypropylene/maleic anhydride mixture after drying was irradiated with a microwave (power of 700 W) for 7 minutes under a nitrogen atmosphere, the rest were the same as those in Comparative Example 1. The sample was tested for melt index, contact angle and grafting ratio, and the test results are shown in Table 1.

Example 6

Except that maleic anhydride (8 parts by mass) was dissolved in acetone (50 parts by mass) to obtain an acetone solution of maleic anhydride, and the dry powder of polypropylene/maleic anhydride mixture after drying was irradiated with a microwave (power of 700 W) for 7 minutes under a nitrogen atmosphere, the rest were the same as those in Example 1. The sample was tested for melt index, contact angle and grafting ratio, and the test results are shown in Table 1.

Comparative Example 7

Except that maleic anhydride (8 parts by mass) was dissolved in acetone (50 parts by mass) to obtain an acetone solution of maleic anhydride, and the dry powder of polypropylene/maleic anhydride mixture after drying was irradiated with a microwave (power of 700 W) for 7 minutes under a nitrogen atmosphere, the rest were the same as those in Comparative Example 1. The sample was tested for melt index, contact angle and grafting ratio, and the test results are shown in Table 1.

Example 7

Except that maleic anhydride (10 parts by mass) was dissolved in acetone (50 parts by mass) to obtain an acetone solution of maleic anhydride, and the dry powder of polypropylene/maleic anhydride mixture after drying was irradiated with a microwave (power of 700 W) for 7 minutes under a nitrogen atmosphere, the rest were the same as those in Example 1. The sample was tested for melt index, contact angle and grafting ratio, and the test results are shown in Table 1.

Comparative Example 8

Except that maleic anhydride (10 parts by mass) was dissolved in acetone (50 parts by mass) to obtain an acetone solution of maleic anhydride, and the dry powder of polypropylene/maleic anhydride mixture after drying was irradiated with a microwave (power of 700 W) for 7 minutes under a nitrogen atmosphere, the rest were the same as those in Comparative Example 1. The sample was tested for melt index, contact angle and grafting ratio, and the test results are shown in Table 1.

Example 8

Except that acrylic acid (5 parts by mass) was dissolved in acetone (50 parts by mass) to obtain an acetone solution of acrylic acid, and the dry powder of polypropylene/acrylic acid mixture after drying was irradiated with a microwave (power of 700 W) for 5 minutes under a nitrogen atmosphere, the rest were the same as those in Example 1. The sample was tested for melt index, contact angle and grafting ratio, and the test results are shown in Table 1.

Comparative Example 9

Except that acrylic acid (5 parts by mass) was dissolved in acetone (50 parts by mass) to obtain an acetone solution of acrylic acid, and the dry powder of polypropylene/acrylic acid mixture after drying was irradiated with a microwave (power of 700 W) for 5 minutes under a nitrogen atmosphere, the rest were the same as those in Comparative Example 1. The sample was tested for melt index, contact angle and grafting ratio, and the test results are shown in Table 1.

Example 9

Except that acrylic acid (5 part by mass) was dissolved in acetone (50 parts by mass) to obtain an acetone solution of acrylic acid, and the dry powder of polypropylene/acrylic acid mixture after drying was irradiated with a microwave (power of 700 W) for 7 minutes under a nitrogen atmosphere, the rest were the same as those in Example 1. The sample was tested for melt index, contact angle and grafting ratio, and the test results are shown in Table 1.

Comparative Example 10

Except that acrylic acid (5 parts by mass) was dissolved in acetone (50 parts by mass) to obtain an acetone solution of acrylic acid, and the dry powder of polypropylene/acrylic acid mixture after drying was irradiated with a microwave (power of 700 W) for 7 minutes under a nitrogen atmosphere, the rest were the same as those in Comparative Example 1. The sample was tested for melt index, contact angle and grafting ratio, and the test results are shown in Table 1.

Example 10

Except that methacrylic acid (5 parts by mass) was dissolved in acetone (50 parts by mass) to obtain an acetone solution of methacrylic acid, and the dry powder of polypropylene/methacrylic acid mixture after drying was irradiated with a microwave (power of 700 W) for 5 minutes under a nitrogen atmosphere, the rest were the same as those in Example 1. The sample was tested for melt index, contact angle and grafting ratio, and the test results are shown in Table 1.

Comparative Example 11

Except that methacrylic acid (5 parts by mass) was dissolved in acetone (50 parts by mass) to obtain an acetone solution of methacrylic acid, and the dry powder of polypropylene/methacrylic acid mixture after drying was irradiated with a microwave (power of 700 W) for 5 minutes under a nitrogen atmosphere, the rest were the same as those in Comparative Example 1. The sample was tested for melt index, contact angle and grafting ratio, and the test results are shown in Table 1.

Example 11

Except that based on 100 parts by mass of an impact copolymerized polypropylene powder, the dry powder of polypropylene/maleic anhydride mixture after drying was irradiated with a microwave (power of 700 W) for 5 minutes under a nitrogen atmosphere, the rest were the same as those in Example 1. The sample was tested for melt index, contact angle and grafting ratio, and the test results are shown in Table 1.

Example 11'

Except that based on 100 parts by mass of an impact copolymerized polypropylene powder, graphene oxide (0.5 part by mass) and ascorbic acid (0.5 part by mass) were dissolved in deionized water (50 parts by mass) to obtain an aqueous solution of graphene oxide; the dry powder of polypropylene/maleic anhydride mixture after drying was mixed sufficiently with the aqueous solution of graphene oxide, then the mixture was dried (dried in a blast drying oven at 80° C.); and the dry powder of polypropylene/maleic anhydride/graphene oxide mixture after drying was irradiated with a microwave (power of 700 W) for 1 minute under a nitrogen atmosphere, the rest were the same as those in Example 1. The sample was tested for melt index, contact angle and grafting ratio, and the test results are shown in Table 1.

Example 11"

Except that the dry powder of polypropylene/maleic anhydride/graphene oxide mixture after drying was irradiated with a microwave (power of 700 W) for 2 minutes under a nitrogen atmosphere, the rest were the same as those in Example 11'. The sample was tested for melt index, contact angle and grafting ratio, and the test results are shown in Table 1.

Comparative Example 12

Except that based on 100 parts by mass of an impact copolymerized polypropylene powder, the dry powder of polypropylene/maleic anhydride mixture after drying was irradiated with a microwave (power of 700 W) for 5 minutes under a nitrogen atmosphere, the rest were the same as those in Comparative Example 1. The sample was tested for melt index, contact angle and grafting ratio, and the test results are shown in Table 1.

Example 12

Except that based on 100 parts by mass of an impact copolymerized polypropylene powder, acrylic acid (5 parts by mass) was dissolved in acetone (50 parts by mass) to obtain an acetone solution of acrylic acid, and the dry powder of polypropylene/acrylic acid mixture after drying was irradiated with a microwave (power of 700 W) for 5 minutes under a nitrogen atmosphere, the rest were the same as those in Example 1. The sample was tested for melt index, contact angle and grafting ratio, and the test results are shown in Table 1.

Comparative Example 13

Except that based on 100 parts by mass of an impact copolymerized polypropylene powder, acrylic acid (5 parts by mass) was dissolved in acetone (50 parts by mass) to obtain an acetone solution of acrylic acid, and the dry powder of polypropylene/acrylic acid mixture after drying was irradiated with a microwave (power of 700 W) for 5 minutes under a nitrogen atmosphere, the rest were the same as those in Comparative Example 1. The sample was tested for melt index, contact angle and grafting ratio, and the test results are shown in Table 1.

Example 13

Except that based on 100 parts by mass of a random copolymerized polypropylene powder, the dry powder of polypropylene/maleic anhydride mixture after drying was irradiated with a microwave (power of 700 W) for 5 minutes under a nitrogen atmosphere, the rest were the same as those in Example 1. The sample was tested for melt index, contact angle and grafting ratio, and the test results are shown in Table 1.

Comparative Example 14

Except that based on 100 parts by mass of a random copolymerized polypropylene powder, the dry powder of polypropylene/maleic anhydride mixture after drying was irradiated with a microwave (power of 700 W) for 5 minutes under a nitrogen atmosphere, the rest were the same as those in Comparative Example 1. The sample was tested for melt index, contact angle and grafting ratio, and the test results are shown in Table 1.

Example 14

Except that based on 100 parts by mass of a random copolymerized polypropylene powder, acrylic acid (5 parts by mass) was dissolved in acetone (50 parts by mass) to obtain an acetone solution of acrylic acid, and the dry powder of polypropylene/acrylic acid mixture after drying was irradiated with a microwave (power of 700 W) for 5 minutes under a nitrogen atmosphere, the rest were the same as those in Example 1. The sample was tested for melt index, contact angle and grafting ratio, and the test results are shown in Table 1.

Comparative Example 15

Except that based on 100 parts by mass of a random copolymerized polypropylene powder, acrylic acid (5 parts by mass) was dissolved in acetone (50 parts by mass) to obtain an acetone solution of acrylic acid, and the dry powder of polypropylene/acrylic acid mixture after drying was irradiated with a microwave (power of 700 W) for 5 minutes under a nitrogen atmosphere, the rest were the same as those in Comparative example 1. The sample was tested for melt index, contact angle and grafting ratio, and the test results are shown in Table 1.

TABLE 1

| | Melt index (g/10 min) | Grafting ratio (%) | Water contact angle (°) |
|---|---|---|---|
| Homopolymerized polypropylene powder (raw material) | 60 | 0 | 96 |

TABLE 1-continued

| | Melt index (g/10 min) | Grafting ratio (%) | Water contact angle (°) |
|---|---|---|---|
| Random copolymerized polypropylene powder (raw material) | 60 | 0 | 95 |
| Impact copolymerized polypropylene powder (raw material) | 30 | 0 | 96 |
| Example 1 | 60 | 0.3 | 67 |
| Example 1' | 59 | 0.3 | 65 |
| Example 1" | 57 | 0.5 | 62 |
| Comparative example 1 | 63 | 0.2 | 91 |
| Example 2 | 51 | 0.4 | 61 |
| Comparative example 2 | 71 | 0.3 | 67 |
| Example 3 | 47 | 0.8 | 55 |
| Comparative example 3 | 83 | 0.8 | 61 |
| Example 4 | 43 | 0.9 | 49 |
| Comparative example 4 | 101 | 0.7 | 54 |
| Comparative example 5 | 113 | 0.3 | 87 |
| Example 5 | 60 | 0.1 | 91 |
| Comparative example 6 | 66 | 0.1 | 94 |
| Example 6 | 43 | 1.3 | 40 |
| Comparative example 7 | 89 | 1.0 | 47 |
| Example 7 | 41 | 2.1 | 30 |
| Comparative example 8 | 93 | 1.4 | 39 |
| Example 8 | 54 | 0.4 | 71 |
| Comparative example 9 | 68 | 0.3 | 80 |
| Example 9 | 51 | 0.7 | 62 |
| Comparative example 10 | 76 | 0.5 | 74 |
| Example 10 | 50 | 0.3 | 79 |
| Comparative example 11 | 70 | 0.3 | 83 |
| Example 11 | 53 | 0.4 | 60 |
| Example 11' | 54 | 0.4 | 58 |
| Example 11" | 51 | 0.6 | 55 |
| Comparative example 12 | 70 | 0.2 | 68 |
| Example 12 | 53 | 0.4 | 71 |
| Comparative example 13 | 69 | 0.3 | 81 |
| Example 13 | 52 | 0.3 | 59 |
| Comparative example 14 | 71 | 0.2 | 68 |
| Example 14 | 53 | 0.3 | 74 |
| Comparative example 15 | 70 | 0.2 | 86 |

It can be seen from Table 1 that the examples of the present invention involving polypropylene grafted under microwave irradiation without the addition of an initiator had a higher grafting ratio than the comparative examples of polypropylene grafted by melt blending with the addition of an initiator, and the melt index of the polypropylene after grafting did not increase, that is, the molecular weight did not decrease. Clearly, the chain scission phenomenon of the backbone of the polar monomer-grafted polypropylene resins obtained in the examples of the present invention was controlled, to thereby ensure that the mechanical properties of the resins were not damaged. In addition, it can be seen that in the comparative examples involving grafting by microwave irradiation with the addition of a peroxide, even under the condition of microwave irradiation grafting, the melt index of the polypropylene rose sharply due to the addition of the peroxide; and due to the competition between grafting reaction and self-polymerization reaction, with the same microwave irradiation time, the grafting ratio of the samples obtained without the addition of a peroxide was always higher than that of the samples obtained with the addition of a peroxide. The higher the grafting ratio was, the lower the water contact angle after film formation was. The grafted polypropylenes according to the present invention were changed from the non-hydrophilicity (contact angle of greater than 90°) of the raw material polypropylene to hydrophilicity.

In addition, it can be seen that in the case of additionally adding an inorganic microwave absorbing medium, the grafting ratio of the grafted polypropylene could be further increased, and the water contact angle and the melt index could be decreased. Further, compared with the case where no inorganic microwave absorbing medium was added, the use of an inorganic microwave absorbing medium could achieve grafted polypropylene resins having similar properties in a shorter microwave irradiation time, thereby improving production efficiency.

Example S1

Based on 100 parts by mass of a homopolymerized polypropylene powder, maleic anhydride (5 parts by mass) was dissolved in acetone (50 parts by mass) to obtain an acetone solution of maleic anhydride; sodium hydroxide (5 parts by mass) was dissolved in deionized water (50 parts by mass) to obtain an aqueous solution of sodium hydroxide; the acetone solution of maleic anhydride was added to the polypropylene powder with mechanical stirring under vacuum and mixed sufficiently, then the mixture was dried (dried in a blast drying oven at 80° C.). The dry powder of polypropylene/maleic anhydride mixture after drying was irradiated with a microwave (power of 700 W) for 3 minutes under a nitrogen atmosphere; after the completion of the microwave irradiation, the powder was immersed in deionized water for 10 minutes and the deionized water was replaced, which was repeated 3 times to ensure the removal of the maleic anhydride monomers that were not involved in the grafting reaction, and then the powder was placed in a blast drying oven at 80° C. for drying; the aqueous solution of sodium hydroxide was added to the dried maleic anhydride-grafted polypropylene powder with stirring under vacuum and mixed sufficiently, after the addition of the aqueous solution of sodium hydroxide, further mixing with stirring and reaction was carried out for 5 minutes. After the completion of the reaction, deionized water was used to wash the powder according to the above washing step, then the powder was placed in a blast drying oven at 80° C. for drying. Finally, the powder and 0.1 part by mass (based on 100 parts by mass of the homopolymerized polypropylene powder) of antioxidant 1010, 0.1 part by mass of antioxidant 168 and 0.1 part by mass of calcium stearate were melt extruded and pelletized in a twin-screw extruder, the temperature of the feeding section of the extruder was 190-200° C., the temperature of the mixing section was 200-210° C., and the temperature of the head was 190-200° C. After extrusion and pelletization, the melt index, contact angle and grafting ratio were tested, and the test results are shown in Table 2.

Comparative Example S1

Based on 100 parts by mass of a homopolymerized polypropylene powder (the same as Example S1), maleic anhydride (5 parts by mass) and dicumyl peroxide (0.005 part by mass) were dissolved in acetone (50 parts by mass) to obtain an acetone solution of maleic anhydride; sodium hydroxide (5 parts by mass) was dissolved in deionized water (50 parts by mass) to obtain an aqueous solution of sodium hydroxide; the acetone solution of maleic anhydride was added to the polypropylene powder with mechanical stirring under vacuum and mixed sufficiently, then the mixture was dried (dried in a blast drying oven at 80° C.). The dry powder of polypropylene/maleic anhydride mixture after drying was irradiated with a microwave (power of 700 W) for 3 minutes under a nitrogen atmosphere; after the completion of the microwave irradiation, the powder was immersed in deionized water for 10 minutes and the deionized water was replaced, which was repeated 3 times to ensure the removal of the maleic anhydride monomers that were not involved in the grafting reaction, and then the powder was placed in a blast drying oven at 80° C. for drying; the aqueous solution of sodium hydroxide was added to the dried maleic anhydride-grafted polypropylene powder with stirring under vacuum and mixed sufficiently, after the addition of the aqueous solution of sodium hydroxide, further mixing with stirring and reaction was carried out for 5 minutes. After the completion of the reaction, deionized water was used to wash the powder according to the above washing step, then the powder was placed in a blast drying oven at 80° C. for drying. Finally, the powder and 0.1 part by mass of antioxidant 1010, 0.1 part by mass of antioxidant 168 and 0.1 part by mass of calcium stearate were melt extruded and pelletized in a twin-screw extruder, the temperature of the feeding section of the extruder was 190-200° C., the temperature of the mixing section was 200-210° C., and the temperature of the head was 190-200° C. After extrusion and pelletization, the melt index, contact angle and grafting ratio were tested, and the test results are shown in Table 2.

Example S2

Except that the dry powder of polypropylene/maleic anhydride mixture after drying was irradiated with a microwave (power of 700 W) for 5 minutes under a nitrogen atmosphere, the rest were the same as those in Example S1. The sample was tested for melt index, contact angle and grafting ratio, and the test results are shown in Table 2.

Comparative Example S2

Except that the dry powder of polypropylene/maleic anhydride mixture after drying was irradiated with a microwave (power of 700 W) for 5 minutes under a nitrogen atmosphere, the rest were the same as those in Comparative Example S1. The sample was tested for melt index, contact angle and grafting ratio, and the test results are shown in Table 2.

Example S3

Except that the dry powder of polypropylene/maleic anhydride mixture after drying was irradiated with a microwave (power of 700 W) for 7 minutes under a nitrogen atmosphere, the rest were the same as those in Example S1. The sample was tested for melt index, contact angle and grafting ratio, and the test results are shown in Table 2.

Comparative Example S3

Except that the dry powder of polypropylene/maleic anhydride mixture after drying was irradiated with a microwave (power of 700 W) for 7 minutes under a nitrogen atmosphere, the rest were the same as those in Comparative example S1. The sample was tested for melt index, contact angle and grafting ratio, and the test results are shown in Table 2.

Example S4

Except that the dry powder of polypropylene/maleic anhydride mixture after drying was irradiated with a microwave (power of 700 W) for 10 minutes under a nitrogen atmosphere, the rest were the same as those in Example S1. The sample was tested for melt index, contact angle and grafting ratio, and the test results are shown in Table 2.

Comparative Example S4

Except that the dry powder of polypropylene/maleic anhydride mixture after drying was irradiated with a microwave (power of 700 W) for 10 minutes under a nitrogen atmosphere, the rest were the same as those in Comparative Example S1. The sample was tested for melt index, contact angle and grafting ratio, and the test results are shown in Table 2.

Example S5

Except that sodium hydroxide (1 part by mass) was dissolved in deionized water (50 parts by mass) to obtain an aqueous solution of sodium hydroxide, and the dry powder of polypropylene/maleic anhydride mixture after drying was irradiated with a microwave (power of 700 W) for 5 minutes under a nitrogen atmosphere, the rest were the same as those in Example S1. The sample was tested for melt index, contact angle and grafting ratio, and the test results are shown in Table 2.

Comparative Example S5

Except that sodium hydroxide (1 part by mass) was dissolved in deionized water (50 parts by mass) to obtain an aqueous solution of sodium hydroxide, and the dry powder of polypropylene/maleic anhydride mixture after drying was irradiated with a microwave (power of 700 W) for 5 minutes under a nitrogen atmosphere, the rest were the same as those in Comparative Example S1. The sample was tested for melt index, contact angle and grafting ratio, and the test results are shown in Table 2.

Example S6

Except that sodium hydroxide (8 parts by mass) was dissolved in deionized water (50 parts by mass) to obtain an aqueous solution of sodium hydroxide, and the dry powder of polypropylene/maleic anhydride mixture after drying was irradiated with a microwave (power of 700 W) for 5 minutes under a nitrogen atmosphere, the rest were the same as those in Example S1. The sample was tested for melt index, contact angle and grafting ratio, and the test results are shown in Table 2.

Comparative Example S6

Except that sodium hydroxide (8 parts by mass) was dissolved in deionized water (50 parts by mass) to obtain an aqueous solution of sodium hydroxide, and the dry powder of polypropylene/maleic anhydride mixture after drying was irradiated with a microwave (power of 700 W) for 5 minutes under a nitrogen atmosphere, the rest were the same as those in Comparative Example S1. The sample was tested for melt index, contact angle and grafting ratio, and the test results are shown in Table 2.

Example S7

Except that sodium hydroxide (10 parts by mass) was dissolved in deionized water (50 parts by mass) to obtain an aqueous solution of sodium hydroxide, and the dry powder of polypropylene/maleic anhydride mixture after drying was irradiated with a microwave (power of 700 W) for 5 minutes under a nitrogen atmosphere, the rest were the same as those in Example S1. The sample was tested for melt index, contact angle and grafting ratio, and the test results are shown in Table 2.

Comparative Example S7

Except that sodium hydroxide (10 parts by mass) was dissolved in deionized water (50 parts by mass) to obtain an aqueous solution of sodium hydroxide, and the dry powder of polypropylene/maleic anhydride mixture after drying was irradiated with a microwave (power of 700 W) for 5 minutes under a nitrogen atmosphere, the rest were the same as those in Comparative Example S1. The sample was tested for melt index, contact angle and grafting ratio, and the test results are shown in Table 2.

Example S8

Except that potassium hydroxide (5 parts by mass) was dissolved in deionized water (50 parts by mass) to obtain an aqueous solution of potassium hydroxide, and the dry powder of polypropylene/maleic anhydride mixture after drying was irradiated with a microwave (power of 700 W) for 5 minutes under a nitrogen atmosphere, the rest were the same as those in Example S1. The sample was tested for melt index, contact angle and grafting ratio, and the test results are shown in Table 2.

Comparative Example S8

Except that potassium hydroxide (5 parts by mass) was dissolved in deionized water (50 parts by mass) to obtain an aqueous solution of potassium hydroxide, and the dry powder of polypropylene/maleic anhydride mixture after drying was irradiated with a microwave (power of 700 W) for 5 minutes under a nitrogen atmosphere, the rest were the same as those in Comparative Example S1. The sample was tested for melt index, contact angle and grafting ratio, and the test results are shown in Table 2.

Example S9

Except that calcium hydroxide (5 parts by mass) was dissolved in deionized water (50 parts by mass) to obtain an aqueous solution of calcium hydroxide, and the dry powder of polypropylene/maleic anhydride mixture after drying was irradiated with a microwave (power of 700 W) for 5 minutes under a nitrogen atmosphere, the rest were the same as those in Example S1. The sample was tested for melt index, contact angle and grafting ratio, and the test results are shown in Table 2.

Comparative Example S9

Except that calcium hydroxide (5 parts by mass) was dissolved in deionized water (50 parts by mass) to obtain an aqueous solution of calcium hydroxide, and the dry powder of polypropylene/maleic anhydride mixture after drying was irradiated with a microwave (power of 700 W) for 5 minutes under a nitrogen atmosphere, the rest were the same as those in Comparative Example S1. The sample was tested for melt index, contact angle and grafting ratio, and the test results are shown in Table 2.

Example S10

Except that maleic anhydride (1 part by mass) was dissolved in acetone (50 parts by mass) to obtain an acetone solution of maleic anhydride, and the dry powder of polypropylene/maleic anhydride mixture after drying was irradiated with a microwave (power of 700 W) for 7 minutes under a nitrogen atmosphere, the rest were the same as those in Example S1. The sample was tested for melt index, contact angle and grafting ratio, and the test results are shown in Table 2.

Example S11

Except that maleic anhydride (8 parts by mass) was dissolved in acetone (50 parts by mass) to obtain an acetone solution of maleic anhydride, and the dry powder of polypropylene/maleic anhydride mixture after drying was irradiated with a microwave (power of 700 W) for 7 minutes under a nitrogen atmosphere, the rest were the same as those in Example S1. The sample was tested for melt index, contact angle and grafting ratio, and the test results are shown in Table 2.

Example S12

Except that maleic anhydride (10 parts by mass) was dissolved in acetone (50 parts by mass) to obtain an acetone solution of maleic anhydride, and the dry powder of polypropylene/maleic anhydride mixture after drying was irradiated with a microwave (power of 700 W) for 7 minutes under a nitrogen atmosphere, the rest were the same as those in Example S1. The sample was tested for melt index, contact angle and grafting ratio, and the test results are shown in Table 2.

Example S13

Except that based on 100 parts by mass of an impact copolymerized polypropylene powder, the dry powder of polypropylene/maleic anhydride mixture after drying was irradiated with a microwave (power of 700 W) for 5 minutes under a nitrogen atmosphere, the rest were the same as those in Example S1. The sample was tested for melt index, contact angle and grafting ratio, and the test results are shown in Table 2.

Example S14

Except that based on 100 parts by mass of an impact copolymerized polypropylene powder, acrylic acid (5 parts by mass) was dissolved in acetone (50 parts by mass) to obtain an acetone solution of acrylic acid, and the dry powder of polypropylene/acrylic acid mixture after drying was irradiated with a microwave (power of 700 W) for 5 minutes under a nitrogen atmosphere, the rest were the same as those in Example S1. The sample was tested for melt index, contact angle and grafting ratio, and the test results are shown in Table 2.

Example S15

Except that based on 100 parts by mass of a random copolymerized polypropylene powder, the dry powder of polypropylene/maleic anhydride mixture after drying was irradiated with a microwave (power of 700 W) for 5 minutes under a nitrogen atmosphere, the rest were the same as those in Example S1. The sample was tested for melt index, contact angle and grafting ratio, and the test results are shown in Table 2.

Example S16

Except that based on 100 parts by mass of a random copolymerized polypropylene powder, acrylic acid (5 parts by mass) was dissolved in acetone (50 parts by mass) to obtain an acetone solution of acrylic acid, and the dry powder of polypropylene/acrylic acid mixture after drying was irradiated with a microwave (power of 700 W) for 5 minutes under a nitrogen atmosphere, the rest were the same as those in Example S1. The sample was tested for melt index, contact angle and grafting ratio, and the test results are shown in Table 2.

Example S17

Except that acrylic acid (5 parts by mass) was dissolved in acetone (50 parts by mass) to obtain an acetone solution of acrylic acid, and the dry powder of polypropylene/acrylic acid mixture after drying was irradiated with a microwave (power of 700 W) for 5 minutes under a nitrogen atmosphere, the rest were the same as those in Example S1. The sample was tested for melt index, contact angle and grafting ratio, and the test results are shown in Table 2.

Example S18

Except that methacrylic acid (5 parts by mass) was dissolved in acetone (50 parts by mass) to obtain an acetone solution of methacrylic acid, and the dry powder of polypropylene/methacrylic acid mixture after drying was irradiated with a microwave (power of 700 W) for 5 minutes under a nitrogen atmosphere, the rest were the same as those in Example S1. The sample was tested for melt index, contact angle and grafting ratio, and the test results are shown in Table 2.

TABLE 2

| | Melt index (g/10 min) | Grafting ratio (%) | Water contact angle (°) |
| --- | --- | --- | --- |
| Homopolymerized polypropylene powder (raw material) | 60 | 0 | 96 |
| Random copolymerized polypropylene powder (raw material) | 60 | 0 | 95 |
| Impact copolymerized polypropylene powder (raw material) | 30 | 0 | 96 |
| Example S1 | 58 | 0.3 | 50 |
| Comparative example S1 | 63 | 0.2 | 63 |
| Example S2 | 51 | 0.4 | 15 |
| Comparative example S2 | 71 | 0.3 | 58 |
| Example S3 | 47 | 0.8 | 0 |
| Comparative example S3 | 83 | 0.8 | 39 |
| Example S4 | 43 | 0.9 | 0 |
| Comparative example S4 | 101 | 0.7 | 17 |
| Example S5 | 51 | 0.4 | 21 |
| Comparative example S5 | 71 | 0.3 | 60 |
| Example S6 | 51 | 0.4 | 15 |
| Comparative example S6 | 71 | 0.3 | 58 |
| Example S7 | 51 | 0.4 | 14 |
| Comparative example S7 | 71 | 0.3 | 58 |
| Example S8 | 51 | 0.4 | 16 |
| Comparative example S8 | 71 | 0.3 | 58 |
| Example S9 | 51 | 0.4 | 19 |
| Comparative example S9 | 71 | 0.3 | 58 |
| Example S10 | 60 | 0.1 | 83 |
| Example S11 | 43 | 1.3 | 30 |
| Example S12 | 41 | 2.1 | 15 |
| Example S13 | 53 | 0.4 | 51 |
| Example S14 | 53 | 0.4 | 60 |
| Example S15 | 52 | 0.3 | 47 |
| Example S16 | 53 | 0.3 | 60 |
| Example S17 | 54 | 0.4 | 58 |
| Example S18 | 50 | 0.3 | 63 |

It can be seen from Table 2 that the examples of the present invention involving polypropylene grafted with an organic acid salt under microwave irradiation without the addition of an initiator had a higher grafting ratio than the comparative examples of polypropylene grafted by melt blending with the addition of an initiator, and the melt index of the polypropylene after grafting did not increase, that is, the molecular weight did not decrease. Clearly, the chain scission phenomenon of the backbone of the organic acid salt-grafted polypropylene resins obtained in the examples of the present invention was controlled, to thereby ensure that the mechanical properties of the resins were not damaged. In addition, it can be seen that in the comparative examples involving grafting by microwave irradiation with the addition of a peroxide, even under the condition of microwave irradiation grafting, the melt index of the polypropylene rose sharply due to the addition of the peroxide; and due to the competition between grafting reaction and self-polymerization reaction, with the same microwave irradiation time, the grafting ratio of the samples obtained without the addition of a peroxide was always higher than that of the samples obtained with the addition of a peroxide.

It can further be seen from Table 2 that for the organic acid salt-grafted polypropylenes according to the examples of the present invention, the higher the grafting ratio was, the lower the water contact angle after film formation was. The organic acid salt-grafted polypropylenes according to the present invention were changed from the non-hydrophilicity (contact angle of greater than 90°) of the raw material polypropylene to hydrophilicity, or even the contact angle may reach 0°.

Additionally, as can be seen from the comparison between Table 1 and Table 2, after hydroxide was added, the water contact angle of the organic acid salt-grafted polypropylene having the same grafting ratio was evidently lower than the water contact angle of the organic acid-grafted polypropylene. Thus the addition of hydroxide could further increase the polarity of the grafted polypropylene.

The invention claimed is:

1. A grafted polypropylene resin,
   comprising a polypropylene backbone having a plurality of side groups, each side group being obtained by grafting a polar monomer on the polypropylene backbone, and a grafting ratio of the polar monomer is 0.01-8%,
   wherein the grafted polypropylene resin does not contain a residue of an initiator,
   wherein the polar monomer is selected from the group consisting of organic acids, anhydrides, esters, and salts thereof, and
   wherein a melt index of the grafted polypropylene resin is less than or equal to a melt index of a grafting base of the grafted polypropylene resin.

2. The grafted polypropylene resin of claim 1, wherein the polar monomer is selected from the group consisting of maleic anhydrides, acids and esters of maleic anhydride (meth)acrylic acids, anhydrides and esters of (meth)acrylic acid, vinyl acetates, alkenyl sulfonic acids and anhydrides and esters thereof, p-styryl formic acid, p-styryl acetic acid, itaconic acid, oleic acid, arachidonic acid and combinations thereof, and salt forms thereof.

3. The grafted polypropylene resin of claim 1, wherein the grafting ratio is 0.01%-6%.

4. The grafted polypropylene resin of claim 1, wherein the value of the water contact angle of the grafted polypropylene resin is less than 90°, as measured on a film prepared from the grafted polypropylene resin by a solution method.

5. The grafted polypropylene resin of claim 1, wherein the polypropylene resin as the grafting base is selected from the group consisting of propylene homopolymers and propylene copolymers and mixtures thereof.

6. The grafted polypropylene resin of claim 5, wherein the grafting base of the grafted polypropylene resin is an impact polypropylene resin comprising a propylene homopolymer and a rubber phase that is a copolymer formed by propylene and a comonomer selected from the group consisting of ethylene, $C_4$, $C_5$, $C_6$ to $C_8$ α-olefins, and mixtures thereof.

7. The grafted polypropylene resin of claim 1, wherein the grafting base of the grafted polypropylene is in a solid form of powder, pellets, or articles.

8. The grafted polypropylene resin of claim 1, wherein the grafted polypropylene resin is obtained by subjecting the polar monomer and the solid polypropylene resin to grafting reaction using microwave irradiation without the addition of an initiator.

9. A method for the preparation of a grafted polypropylene resin of claim 1, comprising the step of subjecting the polar monomer and the solid polypropylene resin to grafting reaction using microwave irradiation without the addition of an initiator.

10. The method of claim 9, wherein the amount of the polar monomer is 0.1-10% by weight based on the weight of the solid polypropylene resin.

11. The method of claim 9, wherein the polar monomer is in liquid or solution form.

12. The method of claim 9, wherein the irradiation power of the microwave irradiation is 100w-2000w; the irradiation time is 1s-120 min.

13. The method of claim 9, wherein the method comprises the following steps:
1) sufficiently mixing the polar monomer with the solid polypropylene resin; and
2) subjecting the mixture obtained in step 1) to microwave irradiation.

14. The method of claim 13, wherein in step 1), the polar monomer and the solid polypropylene resin are sufficiently mixed under vacuum condition.

15. The method of claim 13, wherein the polar monomer is in the form of a solution dissolved in a solvent, and the mixture obtained in step 1) is dried to remove the solvent prior to step 2).

16. The method of claim 13, wherein the irradiated mixture obtained in step 2) is washed to remove the unreacted polar monomers, and is dried, the solvent used for washing is at least one selected from the group of alcohols, ketones, esters and water.

17. The method of claim 9, wherein the solid polypropylene resin used is free of an antioxidant.

18. The method of claim 9, wherein the polar monomer is an organic acid or its anhydride or ester, the product obtained after the grafting reaction under microwave irradiation is further reacted with a base.

19. The method as claimed in claim 18, wherein the base is selected from the group consisting of ammonia and metal hydroxides.

20. The method of claim 18, wherein the amount of the base is 0.1-10% by weight, based on the weight of the polypropylene resin used.

21. The method of claim 9, wherein during the grafting reaction, no auxiliary grafting monomers are used.

22. The method of claim 9, wherein an inorganic microwave absorbing medium is added.

23. The method of claim 22, wherein the amount of the inorganic microwave absorbing medium is 0.1-10% by weight, based on the weight of the solid polypropylene resin.

24. The method of claim 22, wherein the inorganic microwave absorbing medium is selected from the group consisting of metal hydroxides; metal salts; metal oxides; graphite materials; ferroelectrics materials; electrolysis stone; chalcopyrite; and their combinations.

25. The method of claim 22, wherein prior to microwave radiation, a polar monomer, an inorganic microwave absorbing medium and a solid polypropylene resin are sufficiently mixed.

26. The method of claim 25, wherein the polypropylene resin is first mixed with a polar monomer, and then the resulting mixture is mixed with an inorganic microwave absorbing medium.

27. The method of claim 22, wherein the mixture after irradiation is washed to remove unreacted polar monomers, and dried.

28. Pellets or articles, obtained from the grafted polypropylene resin of claim 1, through melt extrusion pelletization or a further molding process.

29. Composite materials, coatable film materials or bonding materials, prepared by blending the grafted polypropylene resin of claim 1 with other polymers.

30. A method for modification of plastics by using the grafted polypropylene resin of claim 1 in the plastics, comprising
blending the grafted polypropylene resin with other polymers to prepare composite materials, coatable film materials or bonding materials; or
adding the grafted polypropylene resin as a compatibilizer when polypropylene is blended and composited with other polymers.

31. The grafted polypropylene resin of claim 2, wherein the ester of (meth)acrylic acid is glycidyl methacrylate.

32. The grafted polypropylene resin of claim 4, wherein the value of the water contact angle of the grafted polypropylene resin is less than 65°, as measured on a film prepared from the grafted polypropylene resin by a solution method.

33. The grafted polypropylene resin of claim 4, wherein the value of the water contact angle of the grafted polypropylene resin is 50°-0°, as measured on a film prepared from the grafted polypropylene resin by a solution method.

34. The grafted polypropylene resin of claim 5, wherein the polypropylene resin as the grafting base is selected from random copolymers of propylene with the comonomer selected from the group consisting of ethylene, $C_4$, $C_5$, $C_6$ to $C_8$-α-olefins, and combinations thereof.

35. The grafted polypropylene resin of claim 7, wherein the polypropylene resin used as the grafting base is polypropylene powder obtained by polymerization using a spherical catalyst.

36. The grafted polypropylene resin of claim 8, wherein the product obtained after the grafting reaction is further subjected to salt formation.

37. The method of claim 10, wherein the amount of the polar monomer is 1-8% by weight based on the weight of the solid polypropylene resin.

38. The method of claim 13, wherein step 2) is performed under an inert gas atmosphere.

39. The method of claim 15, wherein the solvent is at least one selected from the group of alcohols, ketones, esters and water.

40. The method of claim 39, wherein the solvent is acetone or ethanol.

41. The method of claim 18, wherein the organic acid-grafted polypropylene powder is sufficiently mixed and reacted with an aqueous solution of the base under vacuum.

42. The method of claim 18, wherein the method further comprises using a solvent for washing to remove the unreacted base and performing drying treatment, to thereby obtain an organic acid salt-grafted polypropylene resin.

43. The method of claim 19, wherein the base is selected from the group consisting of sodium hydroxide, potassium hydroxide, barium hydroxide, lithium hydroxide, strontium hydroxide, calcium hydroxide, iron hydroxide, ferrous hydroxide, zinc hydroxide, magnesium hydroxide, cobalt hydroxide, gold hydroxide, aluminum hydroxide, copper hydroxide, beryllium hydroxide, and rare earth hydroxide, and combinations thereof.

44. The method of claim 24, wherein the inorganic microwave absorbing medium is selected from the group consisting of potassium hydroxide, barium hydroxide, sodium hydroxide, lithium hydroxide, strontium hydroxide, calcium hydroxide, iron hydroxide, ferrous hydroxide, zinc hydroxide, magnesium hydroxide, cobalt hydroxide, gold hydroxide, aluminum hydroxide, copper hydroxide, beryllium hydroxide, and rare earth hydroxide; ammonium nitrate, potassium nitrate, sodium nitrate, barium nitrate, calcium nitrate, magnesium nitrate, aluminum nitrate, manganese nitrate, zinc nitrate, iron nitrate, ferrous nitrate, copper nitrate, silver nitrate, ammonium chloride, potassium chloride, sodium chloride, barium chloride, calcium chloride, magnesium chloride, aluminum chloride, manganese chloride, zinc chloride, iron chloride, ferrous chloride, copper chloride, ammonium sulfate, potassium sulfate, sodium sulfate, calcium sulfate, magnesium sulfate, aluminum sulfate, manganese sulfate, zinc sulfate, iron sulfate, ferrous sulfate, copper sulfate, silver sulfate, ammonium carbonate, potassium carbonate, sodium carbonate, magnesium carbonate, calcium carbonate, barium carbonate, potassium dihydrogen phosphate, barium titanate, strontium titanate, and copper calcium titanate; ferric oxide, and ferroferric oxide; carbon black, graphite powder, graphene oxide and its reduction products, graphene, carbon nanotubes, and activated carbon; ferroelectrics materials; electrolysis stone; chalcopyrite; and their combinations.

45. The method of claim 25, wherein the mixing is performed under vacuum condition.

46. The method of claim 25, wherein
the polar monomer is dissolved in a solvent; and/or
the inorganic microwave absorbing medium is dissolved or dispersed in a solvent,
wherein the solvent used to dissolve the polar monomer and the solvent used to dissolve or disperse the inorganic microwave absorbing medium are the same or different, and are selected from the group consisting of water, alcohols, ketones, and esters.

47. The method of claim 46, wherein after mixing, drying treatment is performed to remove the solvent.

48. The method of claim 46, wherein the inorganic microwave absorbing medium is dissolved or dispersed in a solvent with addition of a surfactant.

49. The method of claim 27, wherein the mixture after irradiation is washed to remove unreacted polar monomers and remove the inorganic microwave absorbing medium, and dried.

50. The method of claim 28, wherein the grafted polypropylene resin is added with an additive.

* * * * *